United States Patent Office 3,051,666
Patented Aug. 28, 1962

3,051,666
ADHESIVE COMPOSITION FOR ELASTOMERS
William J. Snoddon, Sandusky, Mich., assignor to Yale Rubber Manufacturing Co., Sandusky, Mich., a corporation of Mich.
No Drawing. Filed Nov. 21, 1958, Ser. No. 775,396
4 Claims. (Cl. 260—3.5)

My invention relates to a new and useful improvement in an adhesive composition for elastomers.

It has for its object a provision of an adhesive for bonding elastomers to metals. In the past, numerous adhesives have been prepared for bonding elastomers to metals during vulcanization of the elastomers. Many of these adhesives provide excellent bonds of elastomers to metals but are limited with respect to the type of elastomer to be bonded. An adhesive which is capable of providing a good bond for a butadiene-styrene elastomer may not be satisfactory for a butadiene acrylonitrile elastomer or a polyisobutylene-isoprene elastomer, for example. This problem has been partially circumvented by the use of two adhesives, one exhibiting excellent adhesion to the metal, termed a primer, and one applied over the primer, termed a cover coat, which provides adhesion to the elastomer. Even with such two coat systems, however, the cover coat is specific for certain types of elastomers. Thus a cover coat suitable for a polychloroprene elastomer would not be suitable for a polyisobutylene-isoprene elastomer.

Each type of natural or synthetic rubber may demand a different manufacturing procedure or bonding material and each different metal, under present procedures, will require individual consideration, as there has been no universal method or all-purpose cement heretofore developed.

The present invention has an object to provide an adhesive which in a single coat application bonds compounds based on all of the more common elastomers, except silicone, to a variety of metal surfaces. In carrying out the present invention, experiments have been made on various types of elastomers, as for instance, natural rubber, SBR rubber, nitrile rubber, butyl rubber and neoprene rubber. All of these various types of rubbers were, of course, compounded for the purpose of facilitating vulcanizing and it was found that the adhesive was effective in each case. The following are examples of rubber stock prepared in the course of experiments, to wit:

(1) Natural rubber stock—

| | Parts |
|---|---|
| No. 1 smoked sheet | 100.0 |
| Mercaptobenzothiazole | 1.1 |
| Sulfur | 3.0 |
| Stearic acid | 1.0 |
| Zinc oxide (French process) | 5.0 |
| Carbon black (furnace type) | 45.0 |
| Pulverized trimethyldihydroquinone | 1.0 |
| Wood rosin | 4.0 |

(2) SBR rubber stock—

| | |
|---|---|
| Carbon black loaded oil extender SBR (50/25/100 carbon black/oil/rubber) | 150.0 |
| Mercaptobenzothiazole | 1.75 |
| Sulfur | 2.0 |
| Stearic acid | 0.5 |
| Zinc oxide (French process) | 5.0 |

(3) Nitrile rubber stock—

| | |
|---|---|
| Nitrile rubber (approximately 33% bound acrylonitrile) | 100.0 |
| Mercaptobenzothiazole | 1.5 |
| Sulfur | 2.0 |
| Stearic acid | 1.0 |
| Zinc oxide (French process) | 5.0 |
| Carbon black (furnace type) | 40.0 |

(4) Neoprene rubber stock—

| | Parts |
|---|---|
| Neoprene (W type) | 100.0 |
| Light magnesium oxide | 4.0 |
| Stearic acid | 1.0 |
| Zinc oxide (French process) | 5.0 |
| 2-mercaptoimidazoline | 0.5 |
| Carbon black (furnace type) | 35.0 |

(5) Butyl rubber stock—

| | |
|---|---|
| Butyl rubber (218 type) | 100.0 |
| Mercaptobenzothiazole | 0.5 |
| Tetramethylthiuramdisulfide | 1.0 |
| Sulfur | 2.0 |
| Stearic acid | 3.0 |
| Zinc oxide | 5.0 |
| Carbon black (channel type) | 50.0 |

The adhesive is made from a mill base and a solution base.

An example of a mill base consists of:

| | Parts |
|---|---|
| Chlorosulfonated polyethylene | 100 |
| Sulfur | 8 |
| Carbon black (furnace type) | 20 |

An example of a solution base, is as follows:

| | Parts |
|---|---|
| Mill base | 100 |
| Chlorinated rubber | 100 |
| Polymethylene polyphenylisocyanate | 88 |
| Xylene | 780 |

The mill base may be prepared by milling the materials in a conventional rubber mill. The chlorinated rubber, polymethylene-polyphenylisocyanate, and xylene are admixed and placed in a container. The prepared mill base, after being cut up into small chunks, is added to the aforesaid mixture and thoroughly agitated therewith. This mixture is then applied to the metal by means of dipping, spraying or brushing. The metal is then placed in a mold and the elastomer, compounded with the vulcanizing ingredients, in a soft, tacky condition, is placed in the mold to contact the layer of adhesive material on the metal to be molded to the rubber. The same is then vulcanized under pressure and heat.

For most purposes, bond strengths of greater than 250 p.s.i. are regarded as acceptable. In the tests of the present invention, all adhesion values were greater than 250 p.si. on a variety of ferrous and nonferrous metals and even on metals difficult to bond such as stainless steel and cadmium plate. In most instances, adhesion values more than 400 p.s.i. were obtained. Satisfactory adhesion may also be obtained without the use of chlorinated rubber in the formulae. Thus, an adhesive composition embodying the following formulae may be used:

Mill base:

| | Parts |
|---|---|
| Chlorosulfonated polyethylene | 100 |
| Sulfur | 8.5 |
| Carbon black (furnace type) | 20 |

Solution base:

| | |
|---|---|
| Mill base | 100 |
| Polymethylenepolyphenyl isocyanate | 88 |
| Xylene | 550 |

This second formulae gave similar results as the first example when tested with natural rubber, SBR, neoprene, nitrile and Butyl compositions. Excellent adhesion is obtained between compounded stock based upon all the more common elastomers, except silicone elastomers, and a variety of metal surfaces. The adhesive composition is not critical with respect to a specific type of polyisocyanate. In addition to polymethylenepolyphenylisocyanate 4,4'-methylenedi-o-tolylisocyanate also exhibits satisfactory rubber-to-metal adhesion using the elastomer compositions described above. Likewise, a composition containing both 2,4,4'-triisocyanatodiphenyl ether and 2,4-toluenediisocyanate gives satisfactory results. Also, performance properties of the adhesive composition are not critical with respect to the viscosity grade of chlorinated rubber used. Thus, Parlon (trade name of chlorinated rubber produced by Hercules Powder Company) 125 Type and Parlon S–300 Type both give satisfactory results in the adhesive composition.

The ratios of ingredients of the adhesive composition may be carried over wide ranges. However, both sulfur and isocyanates containing a plurality of isocyanate groups are required for adhesion to both polar elastomers such as nitrile and non-polar elastomers such as Butyl rubber. Adhesive compositions similar to the above examples but containing no sulfur do not give satisfactory adhesive strength values for bonding Butyl rubber to metal. Adhesive compositions similar to the above examples but containing no isocyanates exhibit generally low adhesive strength values.

While there has been disclosed with considerable detail certain preferred manners of performing this invention, it is not intended or desired to be solely limited thereto, for as previously shown the procedure may be modified, the precise proportions of the materials utilized may be varied, and other materials having equivalent properties may be employed if desired without departing from the spirit and scope of the invention.

What I claim is:

1. An adhesive composition for bonding metals to elastomers, said composition comprising: 100 parts of chlorosulfonated polyethylene, 8 parts of sulfur, 88 parts of a polyisocyanate selected from the class consisting of polymethylenepolyphenylisocyanate, 4,4'-methylenedi-o-tolylisocyanate, and mixtures of said polyisocyanates, and an amount of xylene sufficient to dissolve the aforesaid components.

2. An adhesive composition for bonding metals to elastomers, said composition comprising: 100 parts of chlorosulfonated polyethylene, 8 parts of sulfur, 100 parts of chlorinated rubber, 88 parts of a polyisocyanate selected from the class consisting of polymethylenepolyphenylisocyanate, 4,4'-methylenedi-o-tolylisocyanate, and mixtures of said polyisocyanates, and an amount of xylene sufficient to dissolve the aforesaid components.

3. An adhesive composition for bonding metals to elastomers, said composition comprising: 100 parts of chlorosulfonated polyethylene, 8 parts of sulfur, 88 parts of polymethylenepolyphenylisocyanate, and an amount of xylene sufficient to dissolve the aforesaid components.

4. An adhesive composition for bonding metals to elastomers, said composition comprising: 100 parts of chlorosulfonated polyethylene, 8 parts of sulfur, 88 parts of 4,4'-methylenedi-o-tolylisocyanate, and an amount of xylene sufficient to dissolve the aforesaid components.

References Cited in the file of this patent

UNITED STATES PATENTS

| | | |
|---|---|---|
| 2,381,186 | Roquemore | Aug. 7, 1945 |
| 2,415,839 | Neal et al. | Feb. 18, 1947 |
| 2,436,222 | Neal et al. | Feb. 17, 1948 |
| 2,630,398 | Brooks et al. | Mar. 3, 1953 |
| 2,639,252 | Simon et al. | May 19, 1953 |
| 2,729,608 | Strain | Jan. 3, 1956 |
| 2,822,026 | Willis | Feb. 4, 1958 |
| 2,905,582 | Coleman et al. | Sept. 22, 1959 |

FOREIGN PATENTS

| | | |
|---|---|---|
| 141,582 | Australia | June 15, 1951 |

OTHER REFERENCES

Meyrick et al.: Transactions, Institute of Rubber Industry, vol. 25, No. 3, October 1949, "Polyisocynates in Bonding," pages 150 and 162–165.

Warner: Rubber Age, vol. 71, No. 2, May 1952, "Hypalon SR–2—A New Elastomer," pages 205–207, 217–218.

Busse et al.: "Chlorosulfonated Polyethylene—III," India Rubber World, June 1953, pp. 348–350.